United States Patent [19]

Rossfelder et al.

[11] Patent Number: 4,553,443

[45] Date of Patent: Nov. 19, 1985

[54] HIGH FREQUENCY VIBRATORY SYSTEMS FOR EARTH BORING

[75] Inventors: Andre M. Rossfelder, La Jolla; Peter A. Jung, San Diego, both of Calif.

[73] Assignee: Geomarex, La Jolla, Calif.

[21] Appl. No.: 443,069

[22] Filed: Nov. 19, 1982

[51] Int. Cl.[4] .......................... B06B 1/16; B23Q 5/027

[52] U.S. Cl. ........................................ 74/22 R; 74/61; 74/87; 173/49; 173/147; 175/55; 366/123; 366/128

[58] Field of Search ............................ 74/22 R, 61, 87; 173/49, 109, 147, 151; 175/55, 56; 366/108, 117, 120, 123, 128; 474/205

[56] References Cited

U.S. PATENT DOCUMENTS

| | | | |
|---|---|---|---|
| 2,054,253 | 9/1936 | Horsch | 74/61 |
| 2,746,719 | 5/1956 | Seligman | 173/151 X |
| 2,990,022 | 6/1961 | Muller et al. | 173/49 |
| 3,172,485 | 3/1965 | Spannhake et al. | 173/147 |
| 3,189,106 | 6/1965 | Bodine, Jr. | 175/55 X |
| 3,235,014 | 2/1966 | Brooks | 175/56 X |
| 3,394,766 | 7/1968 | Lebelle | 74/61 X |
| 3,456,740 | 7/1969 | Paule et al. | 173/109 |
| 3,564,825 | 2/1971 | Gould et al. | 74/61 X |
| 3,630,357 | 12/1971 | Nolte | 74/61 X |
| 3,841,166 | 10/1974 | Gerberkh | 74/61 |
| 3,948,109 | 4/1976 | Elonen | 74/61 |
| 4,062,527 | 12/1977 | Schmitz | 366/128 X |
| 4,150,727 | 4/1979 | Shepherd | 173/147 |
| 4,445,879 | 5/1984 | Cicognani | 474/205 |

*Primary Examiner*—Allan D. Herrmann

*Attorney, Agent, or Firm*—Romney Golant Martin & Ashen

[57] ABSTRACT

Vibrations having a frequency exceeding 150 Hertz are established in a rigid body by means of a vibrator system that in one embodiment includes a pair of rotating wheels, only one of which has a weighted eccentric secured to its axle. The wheels are coupled together by an endless belt made of a material that dampens the vibrations propagating between the wheels. The unweighted wheel is driven by a flexible shaft connected to its axle. In another embodiment three wheels are used in which two are weighted at the axles. The vibrator system may be used to sink pipes and the like into the ground, or shake a sorting table employed, for example, in the mining industry or a silo hopper for discharging grain. Also disclosed is a method for sinking a pipe or the like into the ground and retrieving it after lowering it a predetermined distance. In this method, wires are attached at each end of the pipe for facilitating its downward motion and its retrieval. In another of the embodiments disclosed the vibrator system can rotate as well as simultaneously vibrate pipe into the ground.

1 Claim, 26 Drawing Figures

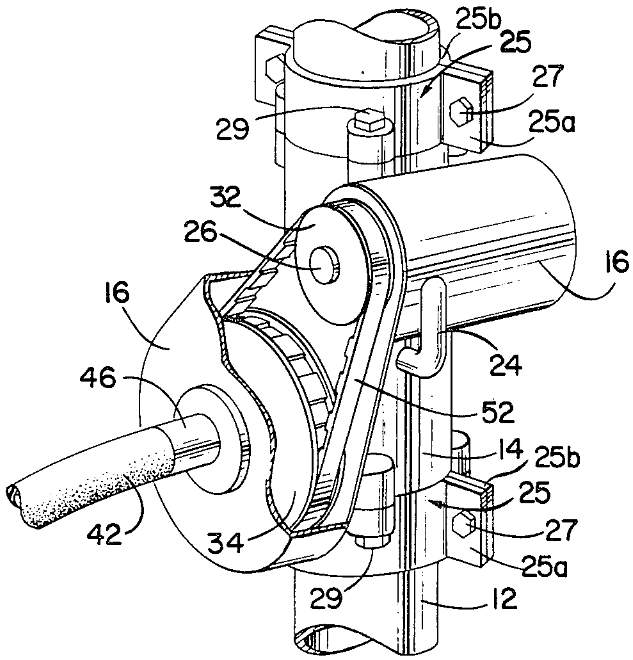
FIG. 4
FIG. 5
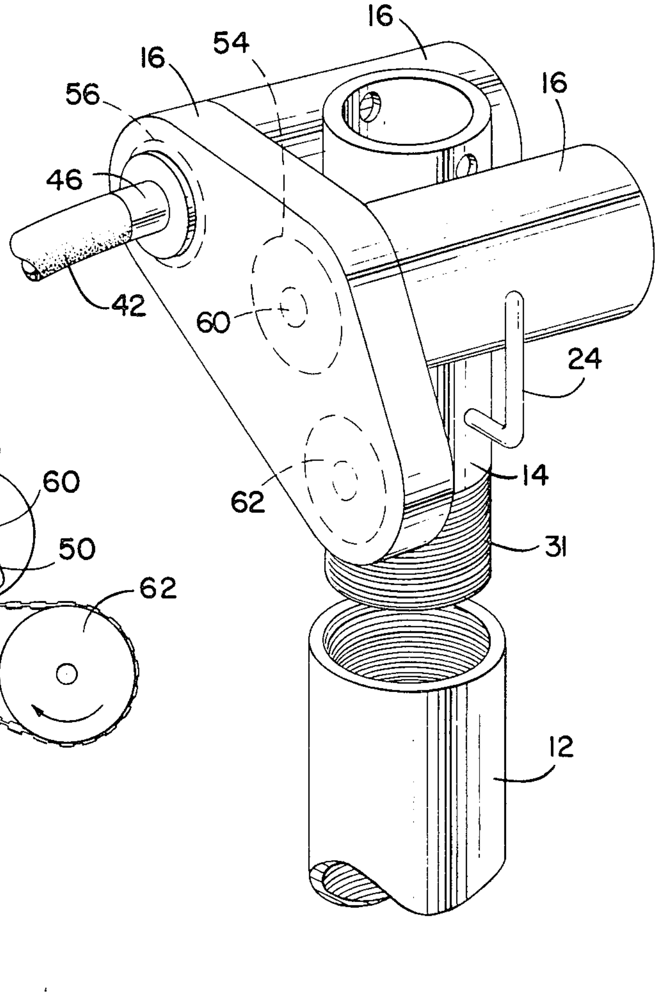
FIG. 6
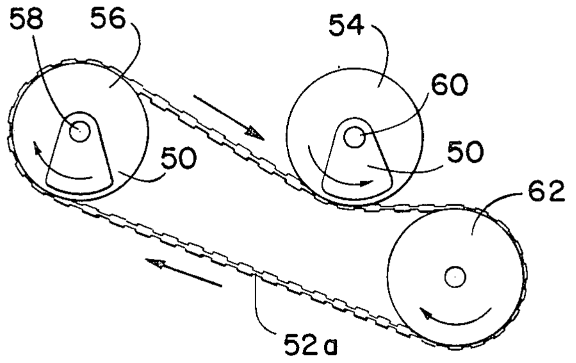

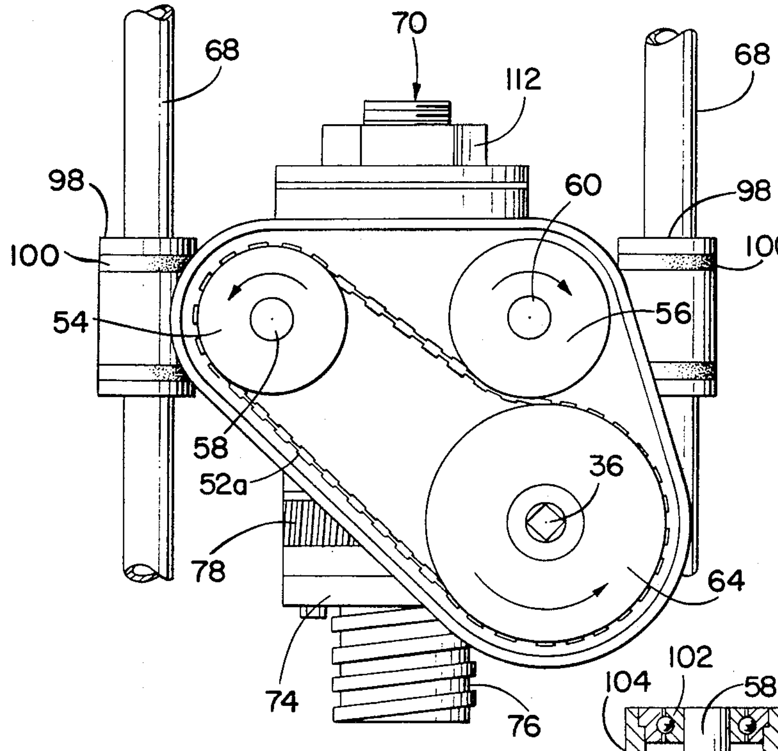
FIG. 11
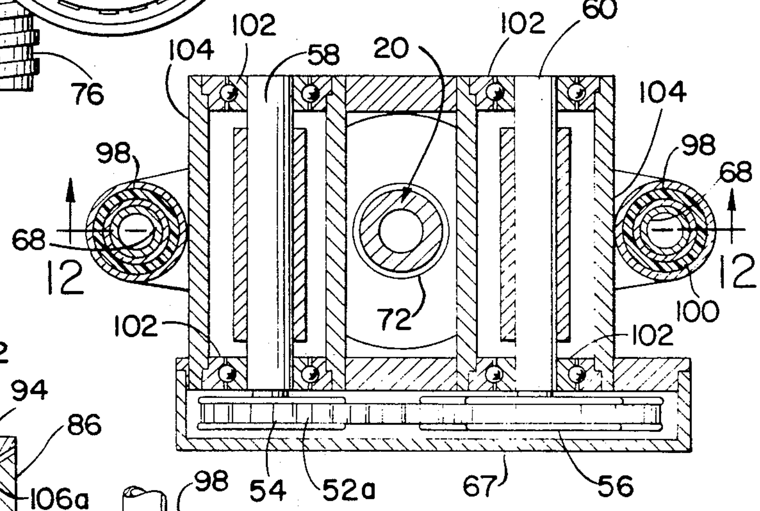
FIG. 13
FIG. 12
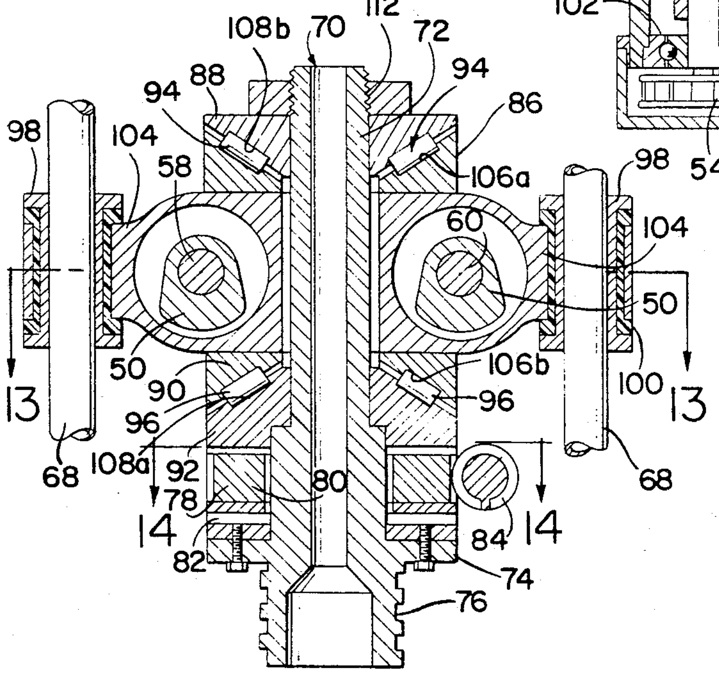

FIG. 14
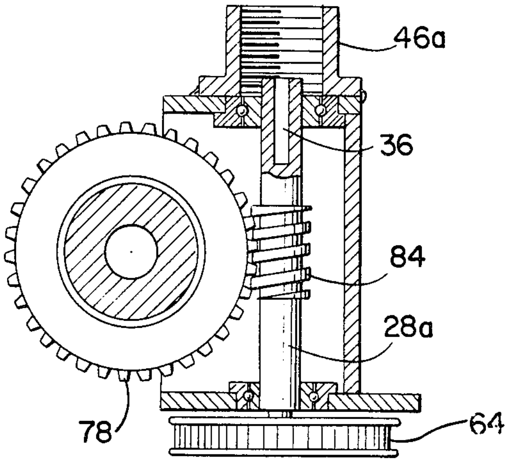
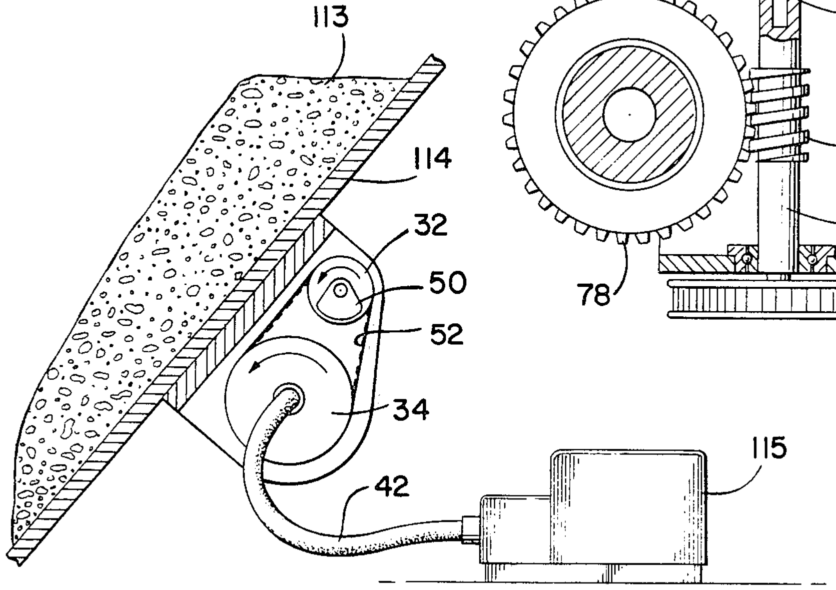
FIG. 15
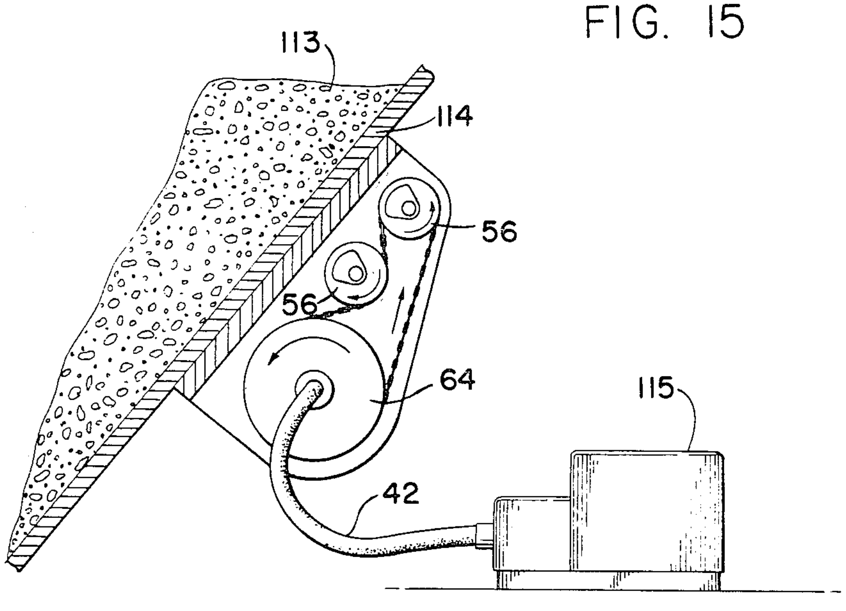
FIG. 16

HIGH FREQUENCY VIBRATORY SYSTEMS FOR EARTH BORING

BACKGROUND OF THE INVENTION

1. Field of the Invention

The present invention is broadly directed to a vibrator system and a method for using a vibrator system to sink pipes or shake equipment. More particularly, the present invention is directed to a mechanical vibrator system which generates frequencies exceeding 150 Hertz for sustained periods of time for earth boring or equipment vibration.

2. Brief Description of the Prior Art

Vibratory devices utilized for generating oscillations in a rigid body and using two identical, symmetrical, contrarotating eccentrics are well known. These contrarotating eccentrics generate a variable oscillatory thrust which alternates in direction 180° along the same axis. This is accomplished because centrifugal forces generated cancel each other when in opposite phase but add to one another when in phase. Such dual-eccentric assemblies are generally achieved by mounting each eccentric mass on an axis and driving it with an independent electric motor. The two axis may be geared together for synchronous rotation, but such gearing may not be necessary if the motors are identical and adequately wired on the same current because the two contrarotating eccentrics will then readily interact and fall into synchronous motion.

The use of these contra-rotating eccentric vibrators for sinking piles and for earth drilling also is a well known technology. These vibrosinkers generally utilize relatively low frequencies, on the order of 1,000 oscillations per minute or 17 Hertz (percussion range) to a maximum of 3,000 to 4,000 oscillations per minute or 50 to 70 Hertz (vibration range). See B. M. Gumenski and N. S. Komarov—(1959) *Soil Drilling by Vibration.* Translated from Russian, Consultants Bureau, New York, 1961.

Albert G. Bodine in a series of patents issued between 1944 and 1968 advocated the implementation of "sound wave generators" or high-frequency oscillators for earth drilling and pile driving, whereby the vibrator generates oscillations matching the natural frequency of the pipe or of the pile to be driven into the ground. (See for example, U.S. Pat. Nos. 2,350,212; 2,554,005; and 2,682,322.) This concept is often known as "sonic drilling" or "resonant drilling". Bodine's patents are unclear about the exact range of frequencies they endeavour to achieve, except that in U.S. Pat. No. 2,717,763, a frequency of 2,000 Hertz is set forth as an example. Bodine's U.S. Pat. Nos. 2,903,242; 2,975,846; 3,054,463; and 3,194,326 describe various vibrators intended to achieve these very high "sonic" frequencies using sets of contra-rotating eccentrics driven and synchronized by meshed gears.

For many years, particularly in Europe and especially in Russia, the combination of directional vibratory drive (axial reciprocating thrusts) and rotary drive (simultaneous rotation of the drill pipe) has been advocated and implemented for earth drilling. See for example, D. D. Barkan—*Methodes de Vibration dans la Construction,* translated from Russian by B. Catoire, Dunod, Paris 1963. The reported rates are in the order of 4,000 r.p.m. (67 Hertz) for vibration and 60 to 120 r.p.m. for rotation.

Similarly, in continuation of Bodine's efforts and patents, the firm Hawker-Siddeley, of Canada, has developed a few years ago a "resonant drill" which associate a relatively high frequency, directional vibratory drive (70 to 150 Hertz) with a slow rotary motion (60 revolutions per minute). See: D. R. Dance, 1981—*Super drill* 150, in Proceedings 3rd Annual Conference of Alaska Placer Mining, University of Alaska, M.I.R.L. Report No. 52, pp. 152-167.

Various researchers have utilized in recent years high-frequency, single-eccentric vibrators of the type known as "concrete vibrators", for driving coring tubes and drilling casings into unconsolidated formations and for extracting casings and piles from the ground. These applications are described in D. E. Lanesky et al, (1979)—*A New Approach to Portable Vibracoring Underwater and on Land,* Journal of Sedimentary Petrology, vol. 49, pp. 655-657; and also in A. M. Rossfelder et al, (1980), *Drilling and Coring Systems for Shallow Water Exploration,* Offshore Technology Conference, Houston, pp. 217-221. These "concrete vibrators", used in the building trade for homogenizing and de-aerating poured concrete, consist of a single eccentric directly rotated at high velocity by a built-in electric motor or, more commonly, by a flexible shaft itself rotated by a power unit at some distance. These vibrators generally work at 10,000 r.p.m., i.e. in the range of 170 Hertz. Attached to a earth boring tube, they generate a non-directional standing wave, whereby, simply stated, the tube resonates like an organ pipe and fluidizes the surrounding ground, drastically lowering its skin friction and its resistance to penetration.

It is believed that the meshed-gear eccentric vibrators proposed by Bodine never reached a commercial stage because the high "sonic" frequencies that he was seeking could not be practically achieved with meshed gear transmissions due to inherent mechanical limitations. In fact, the Hawker-Siddeley "resonant drill" only reaches a maximum of 9,000 r.p.m. or 150 Hertz. It is worth mentioning that the recognized range for "sound waves" is from 20 to 20,000 Hertz. This corresponds to the audible frequencies at the maximum intensity sustainable by human hearing, which can otherwise perceive sound waves of 1,500 to 4,000 Hertz when at their faintest intensity. All oscillators discussed so far are therefore within the "sonic" range, but still at its lowest levels.

The drilling units used in the past having a combination of directional vibratory drive and rotary drive have been relying, to the best of our knowledge, on distinct motors and input shafts for impelling the contra-rotating eccentrics on one hand and rotating the pipe on the other. The Hawker-Siddeley Resonant Drill, for example, which combines a directional vibratory drive and a rotary drive, uses hydraulic motors of different characteristics for each.

When a single eccentric mass—either as single eccentric or as set of eccentrics rotating in the same direction—is directly driven through its axle by a flexible shaft, as in the current off-the-shelf "concrete vibrators", the angular velocity of the flexible shaft has to be the same as the one required from the eccentrics. Because of the rapid increase of internal friction and heat losses within the shaft sheathing as velocity increases, such devices are limited in rotational speed and in the distance the eccentric can be placed from the power unit driving the flexible shaft. For example, a 5 HP flexible shaft for a concrete vibrator is limited to a maximum of 10,000 r.p.m. and to a length of about 5 meters.

Finally, it is worth noting that the prior art does not pursue the concept of an eccentric mass rotating at high velocities. This is because the centrifugal force generated is proportional to the square of the circular speed of an eccentric mass and thus a very high and very destructive force can be attained with relatively small mass. To the best of our knowledge, no one has, on a practical scale, been able to consistently and for sustained periods operate, in air, vibrators of the mechanical type at frequencies exceeding about 150 Hertz. It is to be noted that we draw a distinction between a mechanical system described here and a pneumatic vibrator which is also known in the prior art and which has certain limitations even though pneumatic vibrators may reach frequencies exceeding 150 Hertz.

DESCRIPTION OF THE INVENTION

We have now invented a mechanical vibrator system which, for sustained periods, vibrates at frequencies exceeding 150 Hertz and has approached frequencies of 300 Hertz. Broadly, this vibrator system comprises a plurality of rotatable members, a mass on at least one of these members offset with respect to the axis of rotation of the member, and means coupling the members together so that when one of the members is rotated, the other member revolves, the coupling means characterized as being made of a material adapted to dampen substantially the vibrations propagating between the members. Typically, the material is made of an elastomeric substance such as urethane rubber and, preferably, is reinforced, for example, with plastic fibers (also called "tensile cords") that run along the length of the coupling means and are contained within the elastomeric substance.

Also the primary power unit is separated from the oscillator itself and the power linkage is accomplished by a flexible shaft which consequently isolates the power unit from the damaging high frequency vibrations generated by the oscillator. We believe that this joint utilization of a flexible shaft for the primary drive and of a belt transmission coupling means for the eccentric drive and linkage is novel and solves the mechanical problems encountered by the previous contra-rotating eccentric assemblies and particularly by the twin contra-rotating eccentric types, when pushed above the 5,000 to 9,000 r.p.m. level.

The below described internal belt drive can easily introduce a speed-multiplying factor between the flexible shaft and the eccentric drive by using different cogwheel diameters for the primary wheel turned by the shaft and for the secondary belt-driven wheel or wheels supporting the eccentrics. The flexible shaft can therefore rotate at more conservative speeds and be used in units placed at greater distances than otherwise possible for the high eccentric velocities which are sought.

An additional advantage offered by the flexible shaft drive is that it can be mounted on a power unit provided with a variable-speed drive. Therefore, the rotational velocity of the eccentrics can be controlled at a distance in order to optimize the centrifugal force or the frequency generated by the vibrator without the penalty of parts and weight being added to the vibrator itself.

Also, for earth boring applications, our invention, unlike the prior art, uses the same solid input shaft to achieve in a closely integrated design the high-velocity motion of the vibratory eccentrics and the low-velocity motion of the rotary drive, and yet allow for the interruption of the rotary drive and the continuance of the vibratory drive should the drilling pipe be suddenly blocked.

We can therefore achieve highly efficient vibratory thrusts with very small and lightweight oscillators by aiming toward high orbital speeds of the eccentric.

In a preferred embodiment, two identical and symetrical wheels are employed which rotate counter to each other and are coupled together by an endless belt. Each wheel has a weight or mass attached to its shaft and offset therefrom so that the center of gravity of the wheel does not lie along its axle. A flexible drive shaft, connected to the end of one of the axles of the wheels, drives this wheel, and rotates the other wheel synchronously. When such a vibrator system is attached to a pipe, the system moves with the pipe as it sinks into the ground and the flexible shaft allows this downward movement. This simple structure thus enables the vibrator system to be continuously driven as the pipe sinks into the ground without the need for a complicated drive mechanism. Preferably, the drive shaft is connected to the axle by a coupling that permits the shaft to be easily disconnected. Thus a power source, such as a gasoline or electric motor, can be used for other purposes when coring or boring is not taking place.

In another preferred embodiment, the vibrator system is designed so that the boring pipe will rotate at the same time that it is vibrating. A clutch is provided so that, if the pipe encounters an obstacle, the clutch will disengage the rotary members of the vibrator system but will continue to engage the vibrating members of the device. Thus, the pipe stops rotating but continues to be driven into the ground.

The vibrator system of the present invention has several advantages. It may be used as any conventional vibrator system and is readily mounted to different types of rigid bodies. As mentioned above, one embodiment imparts rotational as well as vibrational movements to the rigid body and, if required, will shift between a vibrational-rotational mode of operation into a vibrational-only mode of operation. Its flexible shaft follows the pipe as it sinks into the ground and can be readily disconnected to drive other equipment when the vibrator system is not in use. But most importantly, the vibrator system can attain for sustained periods of time frequencies exceeding 150 Hertz without the undue generation of heat and wear. Such vibrator systems will more rapidly drive pipes into the ground or achieve the other purposes for which they are employed. Also, because the centrifugal forces generated by an eccentric weight increases with the square of its angular velocity, high performances are obtained here with very light equipment, resulting in a significant decrease of logistics costs.

It should be understood that the above advantages are achieved with a system which is simply constructed, relatively inexpensive, very lightweight, and yet highly reliable.

The main object of the invention is to achieve vibratory devices capable of delivering maximum oscillatory forces per unit weight and of subjecting specific rigid bodies such as drillstems, casings, piles, hoppers, chutes, sorting tables, etc. to forced oscillations approaching their natural frequency.

Another object of the invention is to enhance the lightness and portability of these high-frequency vibratory systems by separating from the oscillator itself other heavy components such as the power unit. This is done through the use of the flexible shaft disconnectable at both ends, and by using the minimum of component parts within the assembly itself, as exemplified by an embodiment using the same power shaft for simultaneously driving two opposite eccentrics at high velocity and one rotary gear at low velocity, combining a high frequency vibratory drive with a slow rotary motion out of the same input shaft.

This latter concern for lightness, efficiency and portability of individual components, particularly derives from the main intended use of the invention, namely to provide earth drilling means which can be economically carried and deployed over difficult terrain.

This purpose is particularly illustrated in an embodiment of the invention which allows for the complete elimination of such elevated structures as a derrick or a drill-mast. To this effect, the main drive is provided by an oscillator firmly clamped on a drill pipe which is guided by a sleeve in a small lightweight stand. Two wirelines are attached at their upper end on the oscillator and at the lower end on a casing shoe or core nose, thus penetrating into the ground with the drill pipe. These wire-lines are held on a winch drum supported by the stand. Turning this drum in one direction will wind and force the upper lines to pull down the vibrator and the drill pipe; turning the drum in the opposite direction will wind and force the lower lines to pull up the drill pipe from the ground, with the assistance of the vibrations if appropriate.

The features of the present invention can be best understood, together with further objects and advantages, by reference to the following description, taken in connection with the drawings in which like numerals indicate like parts.

DESCRIPTION OF THE DRAWINGS

FIG. 4 is a perspective view of another embodiment of the vibrator system of this invention, similar to that shown in FIG. 1 but designed to be mounted on an intermediate portion of a boring pipe.

FIG. 5 is a perspective view of yet another embodiment of the present invention employing two contrarotating wheels having identical weights attached to their axles in comparable locations so that the wheels are symetrical.

FIG. 6 is a diagrammatic elevational view of the FIG. 5 embodiment showing the symetrical wheels.

FIG. 11 is an end elevational view of an additional embodiment of the present invention, with the end plate of the housing removed.

FIG. 12 is a cross-sectional elevational view taken along line 12—12 of FIG. 13.

FIG. 13 is a cross-sectional plan view of the vibrator system taken along line 13—13 of FIG. 12.

FIG. 14 is a cross-sectional plan view taken along line 14—14 of FIG. 12.

FIG. 15 is a view schematically illustrating the use of one of the vibrator systems of this invention to remove granular material from a storage bin.

FIG. 16 is a view schematically illustrating using another of the vibrator systems of this invention to remove granular material from a storage bin.

DESCRIPTION OF THE PREFERRED EMBODIMENTS

Figure 1:
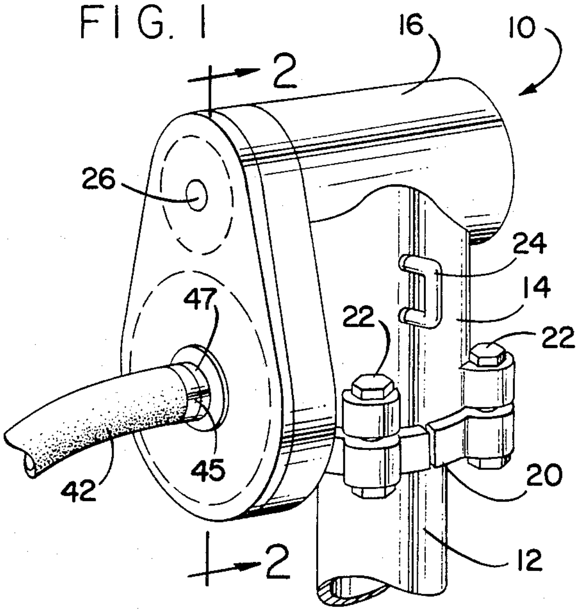
FIG. 1 is a perspective view of an embodiment of the present invention in which only one of the rotatable members employs an offset weighted mass.

While the present invention is susceptible to various modifications and alternate constructions, illustrative embodiments are shown in the drawing and will be described in detail herein below. It should be understood, however, that it is not the intention to limit the invention to the particular forms disclosed; but on the contrary, the invention is to cover all modifications, equivalences, and alternate constructions falling within the spirit and scope of the invention as expressed in the appended claims.

Figure 2:
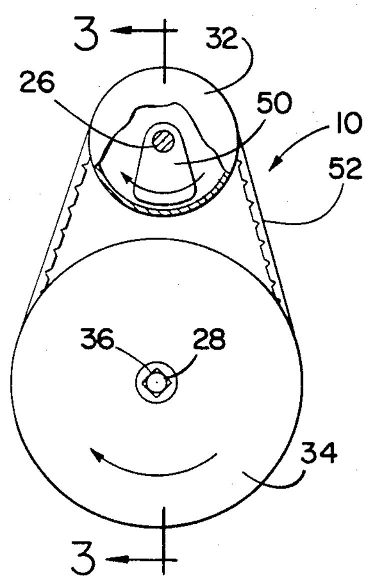
FIG. 2 is an elevational view of the vibrator system shown in FIG. 1 taken along line 2—2 of FIG. 1.
Figure 3:
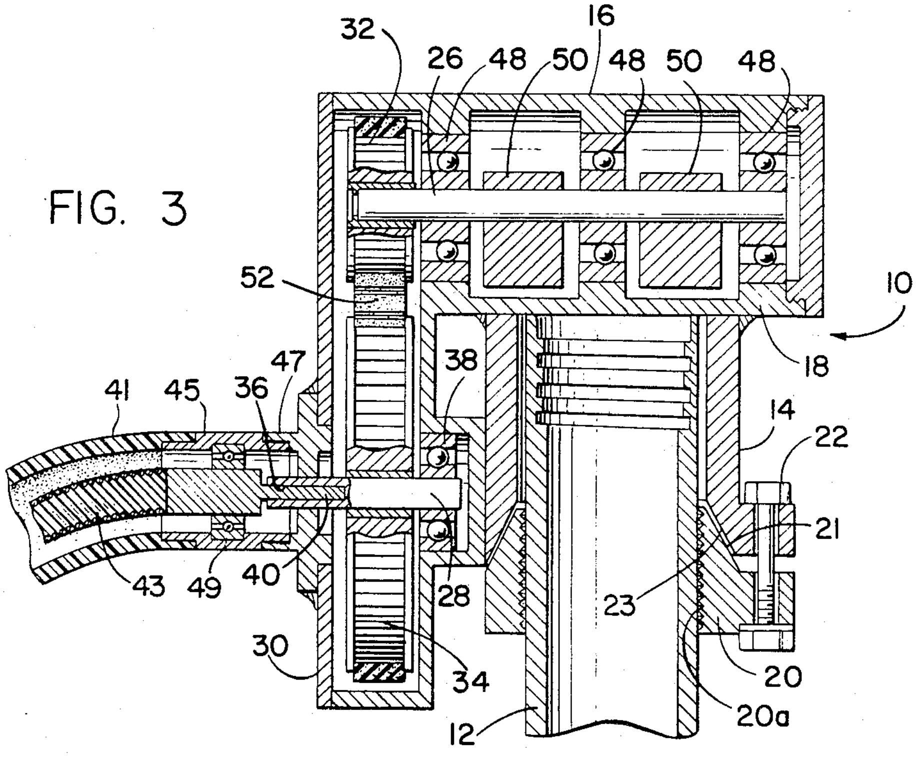
FIG. 3 is a cross-sectional view taken along line 3—3 of FIG. 2.

As shown in FIGS. 1 through 3, the vibrator system 10 of the present invention is securely attached to a rigid body such as a pipe 12 to which vibration is imparted. The vibrator system 10 includes a housing 16 having a horizontally disposed cylindrical member 16 affixed to a vertically disposed cylindrical mounting 14. These two elements form a generally T-shaped configuration. The mounting 14 fits over and receives within it the end of the pipe 12. The end of the pipe extends into the interior of the mounting until it abuts the member 18 of the housing. A clamp 20 is connected to the mouth of the mounting by bolt-nut combinations 22. A clamp surface 20*a* tightens about the pipe when the bolt-nut combinations are tighten due to the sliding engagement of a frusto-conical wall 21 of the clamp and the frusto-conical wall 23 of the mounting. Extending outwardly from the mounting is an eyelet 24. As will be explained below, a line may be attached to this eyelid to assist in pulling the pipe downwardly into the ground or to assist in retrieving the pipe.

Variations for clamping the mounting to the pipe may be used in place of that shown in FIGS. 1 and 3. For example, in FIGS. 4 and 7 there are illustrated casing clamps 25 each comprising two semi-circular elements 25*a* and 25*b* which seize the pipe when the bolts 27 are tighten. The elements are attached to the mounting with bolts 29 and are able to move slightly with respect to the mounting when the bolts 27 are tighten. In FIG. 5 another variation is illustrated where the mounting includes screw threads 31 which engage the upper end of the pipe 12. As will be explained below in reference to FIGS. 11–14, this type of attachment is preferred when the pipe is rotated in addition to being vibrated.

Returning to FIGS. 1–3, pair of axles 26 and 28 are carried in the housing. The axle 26 lies along the longitudinal length of the horizontal member 18, while the other axle 28 is parallel to the axle 26 and is positioned in a wheel enclosure 30 of the housing and extends downwardly from the member 18 to form an L-shaped configuration therewith. Each axle 26 and 28 have, respectively, wheels 32 and 34 mounted at an end thereon. One end of the axle 28 has a socket 36 therein which has a square cross section. The other end of this axle 28 is supported by a bearing 38 carried by the housing. The socket end protrudes from the housing and is adapted to be connected to a square cross sectioned spindle 40 of a flexible driveshaft 42. The flexible driveshaft has a stationary casing or hose 41 within which is a flexible shaft element 43. The shaft is connected at one end to a power source (not shown) and at the other end by the spindle 40 to the socket 36. At the end of the hose is an adapter 45 which is engaged to a coupling 47. Supporting the shaft is a ball bearing 49. The coupling allows for easy and quick connection and disconnection.

The other wheel 32 is carried on the axle 26. This axle, which is mounted to the housing through spaced-apart ball bearings 48, has secured to it a pair of spaced-apart weights 50 which are offset with respect to the longitudinal axis of the axle 26. Thus the center of gravity of the wheel is offset with respect to its axis of rotation, causing a vibration as the wheel rotates.

Both wheels have in their outer peripheries teeth and an endless flexible urethane belt 52, also having teeth, is wound about these wheels, with the teeth of the wheels meshing with the teeth of the belt. Thus, when the flexible shaft rotates, the wheel 34 turns in a clockwise direction as viewed in FIG. 2, causing the other wheel 32 to also turn in a clockwise direction. Since the wheel 34 has a substantially larger diameter than the wheel 32, the smaller diameter wheel will revolve at a higher angular velocity than the larger wheel. By attaching the flexible shaft 42 to the larger wheel not only is a mechanical advantage achieved but it may move at a lesser r.p.m. than the smaller eccentric wheel and thus sustain less heat generation, heat damage and wear.

In accordance with one of the principal features of this invention, the belt 52, being made of an elastomer, will dampen the vibrations propagating along it between the wheels 32 and 34. This enables the vibrator system to obtain the desirable high rates of vibrations exceeding 150 Hertz and in some instances approaching or even exceeding 300 Hertz. It is preferred that the belt, have teeth which mesh with the teeth in the periphery of the wheels so that the frequency of vibration is carefully controlled. If the belt was able to slip, this control would be lost. As mentioned above, the belt is reinforced with fibers. Suitable belts may be obtained from Uniroyal, of Middlebury, Conn., The Goodyear Tire and Rubber Company, of Lincoln, Nebr.; The Gates Rubber Company, of Denver, Colo., or other similar suppliers.

The embodiment of the invention shown in FIG. 4 is essentially the same as that shown in FIGS. 1 through 3 except that the weighted wheel 32 is mounted to one side of the pipe 12 as opposed to directly over the top of the pipe. This permits the vibrator system to be attached to an intermediate portion of the pipe rather than at the top as is the case with the embodiment shown in FIGS. 1 though 3. In accordance with this embodiment, the cylindrical mounting 14 is open at both ends and has clamps 25 placed at both ends which permit the pipe to pass through the mounting. The housing 16 is then essentially the same as that shown in FIGS. 1 through 3 except that it is tilted from a vertical reference plane.

The embodiments shown in FIGS. 1 through 4 only employ a single weighted wheel 32. This type of vibrator will generate a non-directional standing wave in the pipe which will result in reducing the friction of the ground on the pipe wall to such extent that, in many instances, the pipe will sink into the ground under its own weight or with little assistance from an outside pull-down force. The more preferred embodiment, however, employs a pair of contra-rotating, identical and symmetrical wheels. Such vibrator systems will transmit to the pipe a directional oscillatory force along its longitudinal axis, causing the pipe to penetrate into the ground under the direct thrust generated by the vibrator and compounded with the weight of the system and any additional pull-down force. This will maximize the energy available for sinking the pipe. Such a vibrator system will be able to drive a pipe into most types of ground at a faster rate than a vibrator system employing only a single weighted wheel. Vibrator systems of this preferred type are illustrated in FIGS. 5 through 21.

The FIGS. 5 and 6 embodiment employs two weighted wheels 54 and 56 which are symmetrical having the same number and size weights displaced in the same positions along the respective axles 58 and 60. By same size weights we mean weights of essentially identical shape and mass. These weighted wheels rotate counter to each other as illustrated in FIG. 6. A third idler wheel 62 is provided so that the desired counter rotation of wheels 54 and 56 can be obtained.

In accordance with the present invention, a flexible belt 52*a* having teeth on both the external and internal sides of the belt is wound about the periphery of the wheels 56 and 62. The teeth on the external side mesh with the teeth of the wheel 54 while the teeth on the internal side mesh with the teeth of the wheels 56 and 62.

The wheel 56 has a coupling 46 like that illustrated in FIG. 3 attached to its end which permits the flexible shaft 42 to be removably attached to the axle 58. The vibrator system of this embodiment has its cylindrical mounting 14 threaded at one end 31 so that it simply is screwed onto the threaded end of the top of the pipe. Note, the wheels 54, 56, and 62 all have the same diameters and will, therefore, rotate at the same rotational velocity.

When the shaft 42 is rotated in a clockwise direction as viewed in FIG. 6, the wheel 56 turns in the same direction, and the upper flight of the belt 52*a* moves to the right turning the wheel 54 in a counter-clockwise direction, and the lower flight moves to the left turning the idler wheel 62 in a clockwise direction. This generates a directional oscillatory force in the pipe which propagates vertically along the pipe, reversing between downward and upward directions.

Figure 7:
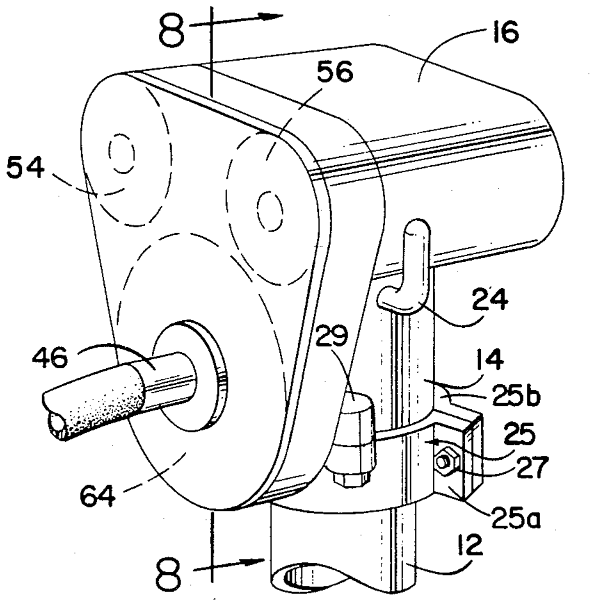
FIG. 7 is a perspective view of still another embodiment of the vibrator system of the present invention.
Figure 8:
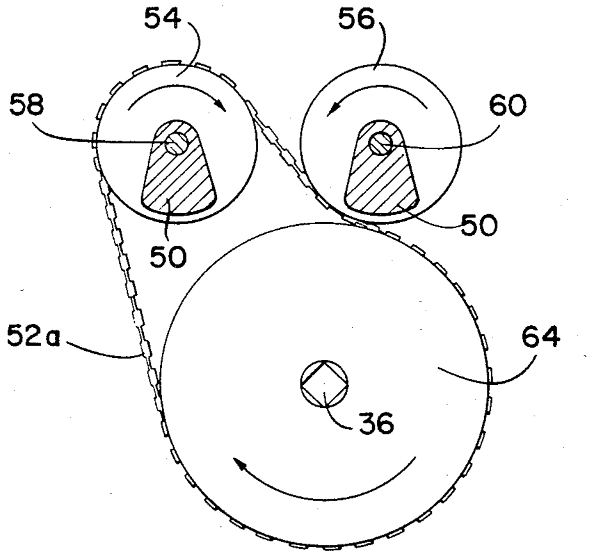
FIG. 8 is an elevational view taken along line 8—8 of FIG. 7.

The embodiment shown in FIGS. 7 and 8 is similar in some respects to the embodiment shown in FIGS. 5 and 6 in that it is mounted to the top of the pipe 12 and employs two contra-rotating identically weighted wheels 54 and 56 coupled together by the belt 52*a.* In this embodiment, a clamp 25 similar to that shown in FIGS. 1 through 3, is used to secure the vibrator system to the top of the pipe. The principal difference between the embodiment shown in FIGS. 7 and 8 and that shown in FIGS. 5 and 6 is that a large diameter drive wheel 64 is connected to the flexible shaft. Consequently, the weighted wheels 54 and 56 will revolve at a higher rotational velocity than the drive wheel 64 and the slower turning flexible shaft is saved from higher heat exposure, damage and wear.

Figure 9:
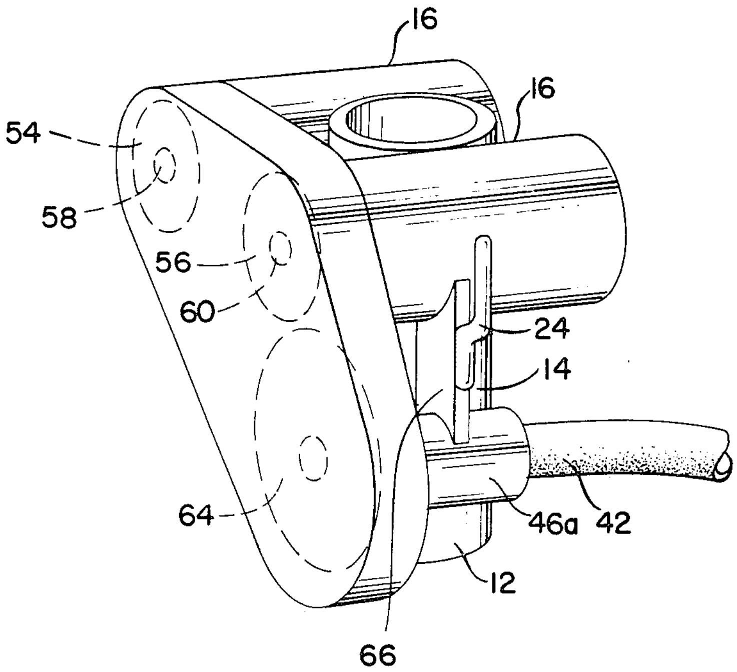
FIG. 9 is a perspective view of another embodiment of the vibrator system of the present invention.
Figure 10:
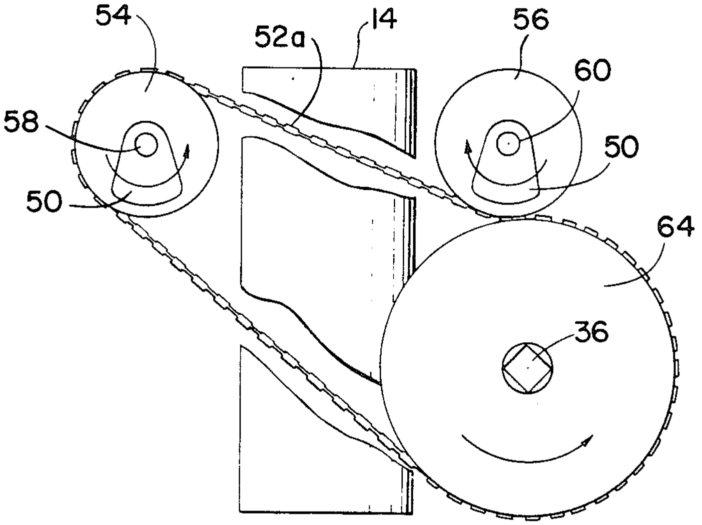
FIG. 10 is a diagramatic elevational view showing the wheels of the FIG. 9 embodiment.

The embodiment shown in FIGS. 9 and 10 is similar to that shown in FIGS. 7 and 8 except that the cylindrical mounting member 14 is open at both ends and the weighted wheels 54 and 56, coupled together by the belt 52*a,* are disposed on opposite sides of this mounting member so that the pipe can pass through the mounting member, enabling the vibrator system to be mounted at an intermediate position along the pipe instead of at the top end of the pipe. Also, the coupling 46*a* for the drive wheel is mounted on a bracket 66 secured to the side of the cylindrical mounting 14. This provides additional support for the flexible shaft 42.

The embodiment shown in FIGS. 11 through 14 provides a vibrator system which imparts rotational as well as vibrational movement to the pipe. In this embodiment a housing 66 carries the vibrator system and is guided by two posts 68 on a frame not represented. This vibrator system is provided with a mounting member 70 which has an upwardly projecting shaft portion 72 extending through the housing, a platform 74, and a threaded end 76 which is secured to the top of the threaded pipe. The platform 74 carries a crown gear 78 FIG. 12, which has a central opening 80 through which the upwardly projecting shaft portion 72 passes. This gear is coupled to the platform by a slip clutch 82. As best shown in FIG. 14, a worm screw 84 mounted on the axle 28*a* driven by a flexible shaft attached to the coupling 46*a* turns the crown gear, which through the clutch, causes the mounting member 70 to rotate and turn the pipe. If the pipe engages some object which provides sufficient resistance, the clutch will slip and the pipe will no longer rotate.

In more detail the embodiment of FIGS. 11–14 is able to vibrate as well as rotate by having the following configuration. Two thrust bearings 94 and 96 are mounted to allow rotation. These bearings include stationary rings 86 and 90. Connected to the stationary rings are the two weighted wheels 54 and 56 and their respective axles 58 and 60, the belt 52*a*, as well as the weights 50 all in essentially the same manner as shown and described in FIG. 10. The axles 58, 60 are supported by ball bearings 102 which in turn are mounted to housing arms 104 of the housing 66. A cover plate 67 encloses these elements. The arms in turn are connected to guide sleeve 98 which fit around the posts 68. Vibration damping material 100 is included to assist isolating the posts from vibrations generated in the pipe.

The thrust bearings also include movable rings 88 and 92 separated from the stationary rings by tapered rollers located in raceways 106*a,* 108*a* and 106*b,* 108*b.* The movable rings are connected to the shaft portion 72 of the mounting member 70 to which is also connected the platform 74, the crown gear 78 and the slip-clutch 82. A lock nut 112 holds the parts in place. In operation, the flexible shaft turns the axle 28*a* and the worm screw 84 causes the mounting member 70 to rotate and turn the pipe. At the same time, the same axle 28*a* turns the drive wheel 64 and the belt 52*a* causing the wheels 54 and 56 to rotate in counter directions establishing a directional force along the pipes longitudinal axis. If the clutch 82 slips because the pipe encounters a high resistance, the worm screw will continue to turn the crown gear, but the mounting member will not rotate the pipe. Nevertheless, the pipe continues to vibrate.

As illustrated in FIGS. 15 and 16, the vibrator system of this invention may be used to remove granular material 113 from a bin 114 by shaking the bin. FIG. 15 illustrates using the vibrator system shown in FIGS. 1 through 3. This embodiment has been modified so that it may be attached to the side of the bin rather than to the top of a pipe. In similar fashion in FIG. 16, the embodiment shown in FIGS. 5 and 6 has been modified so that it's housing is attached to the bin instead of a pipe. Both vibrator systems in FIGS. 15 and 16 are shown connected through a flexible shaft 42 to a power source 115.

In accordance with another important feature of this invention, the vibrator system is particularly adapted to sink pipes or coring tubes into the ground without the assistance of an high overhead derrick or a gantry. This vibrator system provides a novel way of both sinking the pipe into the ground and then retrieving it. This aspect of our invention is illustrated in FIGS. 17*a* through 21.

Figure 17A:
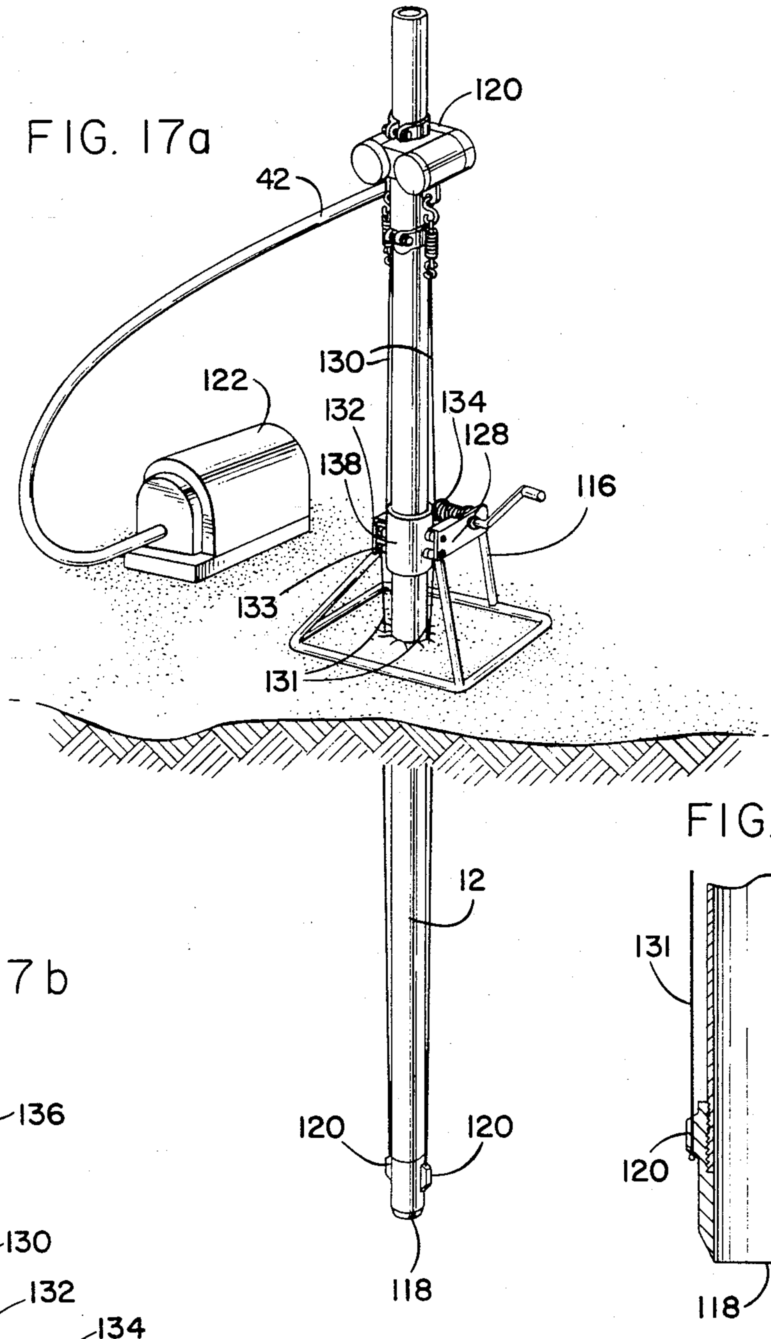
FIG. 17*a* is a perspective view illustrating the use of this invention for sinking a pipe into the ground.
Figure 17C:
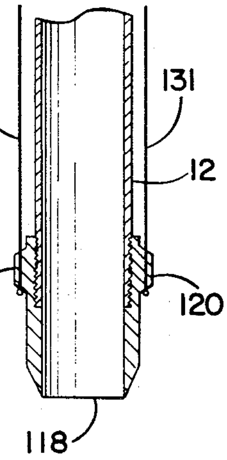
FIG. 17*c* is a partial elevational view showing the lines referred to in FIG. 17*a* attached to a core cutter for the pipe.
Figure 17B:
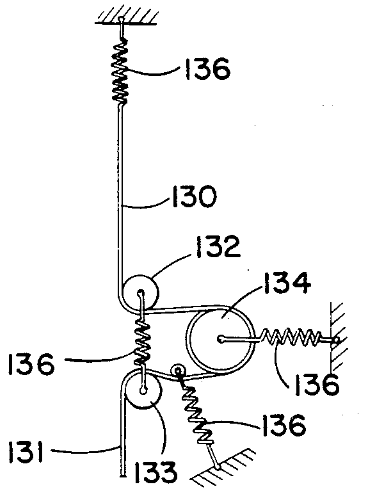
FIG. 17*b* is a schematic diagram illustrating the tensioning and vibration isolation of lines which assist in sinking and retrieving pipe shown in FIG. 17*a*.

As shown in FIGS. 17*a* through *c,* the pipe 12 is held in a stand 116 in a generally vertical position. The end of the pipe adjacent to the ground is inserted into a core-cutter or shoe 118 (also shown in FIG. 18*c*) which has outwardly extending fastening ribs 120 and a core catcher (not shown). These ribs are tapered at the tops and bottoms so that they may more easily move through the ground both when the pipe is being sunk and when it is being retrieved. A vibrator system 120 is connected to an upper portion of the pipe as shown. The vibrator system illustrated in FIGS. 9 and 10 is represented in FIG. 17*a* but any vibrator system shown in FIGS. 1 to 10 can be used for this purpose. It includes the flexible driveshaft 42 attached to a power unit 122 which causes the vibrator system to vibrate and establish a directional force along the longitudinal axis of the pipe, urging the pipe downwardly into the ground. The stand 116 includes a winch 128, and two pairs of wires 130 and 131 are attached to this winch both between the vibrator and between the shoe. Wires 130 are wrapped around pulleys 132 and their ends are attached to a winch drum 134 as best illustrated in FIG. 17*b*. The wires 131 are wrapped around the pulleys 133 and their ends are attached to the winch drum 134. The pulleys and winch drum are attached to vibration isolation springs 136 which dampen the vibrations from the vibrator and also maintain the wires 130 and 131 under tension.

When the pipe is being driven into the ground, it passes through a sleeve 138 in the stand which guides and maintains the pipe in a generally vertical position, and the winch 128 is turned in a direction so that the wires 130 extending down from the vibrator system are pulled toward the surface of the ground to establish a second force, in addition to the vibratory force, to urge the pipe downwardly. The winch drum 134 may be driven either electrically or may be worked manually through a handle. As the winch turns in a clockwise direction as viewed in FIG. 17*b*, the wires 130 from the vibrator system are wound about the drum and simultaneously the wires 131 to the shoe are unwound. When the pipe has been sunk a predetermined distance into the ground, and it is desired to retrieve the pipe from the ground, the direction of rotation of the winch is reversed. This creates tension in the wires 131 which pull the shoe and thereby the pipe upwardly. These wires are wound about the winch drum as the pipe is withdrawn from the ground and the wires to the vibrator system are unwound from the drum. The upwardly directed force on the pipe causes the pipe to move upwardly in a generally vertical direction. The vibrator system may be operated during the retrieval of the pipe if the friction of the ground needs to be overcome.

The wires are preferably steel cables. The wires need not, however, be very strong or of very large cross section, because the vibrations generated in the pipe by the system drastically reduce the friction between the outside wall of the pipe and the ground. Therefore, the forces required for driving the pipe down into the ground and even more so for pulling the pipe from the ground are substantially reduced. Moreover, because the vibrator system of this invention establishes a substantially higher frequency than heretofore obtainable less force is required. Also sudden twists and jerks on the wires are eliminated because a regular periodic motion of vibration is established.

Figure 18A:
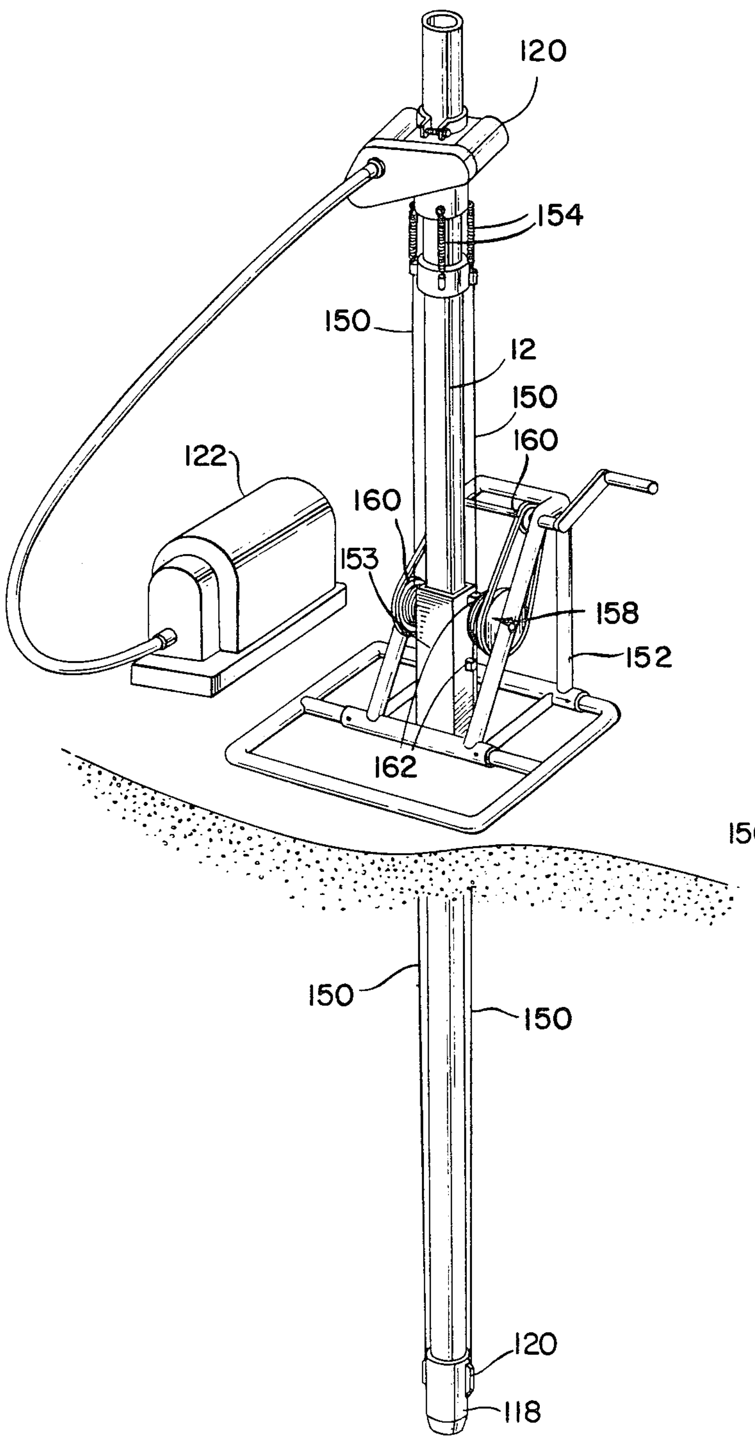
FIG. 18*a* is a perspective view again illustrating the use of this invention for sinking pipe into the ground, but using slightly different equipment for this purpose than that shown in FIGS. 17*a*, 17*b* and 17*c*.
Figure 18B:
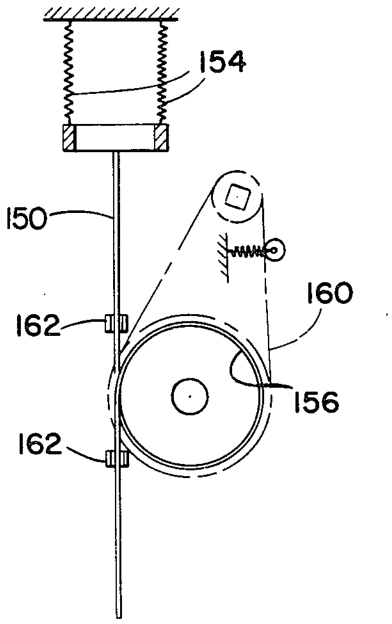
FIG. 18*b* is a schematic diagram illustrating the tensioning and vibration isolation of lines which assist in the sinking and retrieving pipe of the equipment shown in FIG. 18*a*.
Figure 18C:
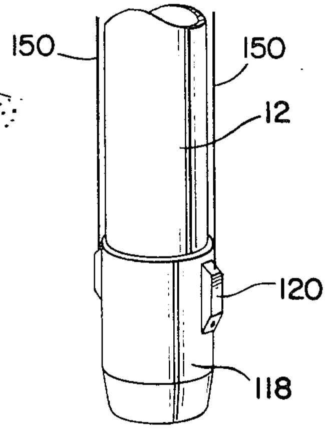
FIG. 18*c* is a perspective view showing the lines referred to in FIG. 18*a* attached to a core cutter for the pipe.

The embodiment shown in FIGS. 18*a* through 18*c* is similar to that shown in FIGS. 17*a* through 17*c*. The principal difference is that only one pair of wires 150 is used to assist in sinking and retrieving the pipe 12. A stand 152 is used to hold the pipe in a generally vertical position. This stand has a generally rectangular sleeve 153 through which the pipe passes. The upper ends of the wires 150 are connected to tensioning and vibration-dampening springs 154 which are in turn secured to the vibrator system 120. Each wire has an intermediate portion wrapped around the drum 156 of a winch 158. These wires are maintained under tension by the springs and consequently are tightly wrapped to the winch's drum 156. Chain sprocket assemblies 160 are used to turn the drum 156. The opposite ends of the wires 150 are each attached to the ribs 120 of the shoe 118 mounted at the base of the pipe 12. Guides 162 direct the wires, keeping them from becoming entangled in the sprocket assemblies 160.

The apparatus shown in FIGS. 18*a* through 18*c* operates in essentially the same way as that shown in FIGS. 17*a* through 17*c*, except that the wires 150 simply pass over the surface of the drum as the winch turns. As before, when the drum rotates in a clockwise direction, the wires pull upwardly on the shoe 118, exerting an upward force to assist in retrieving the pipe from the ground. When the drum rotates in the opposite direction the pipe is assisted into the ground. Thus it is apparent that a very light and portable system is disclosed, one which is very simple and reliable.

Figure 20A:
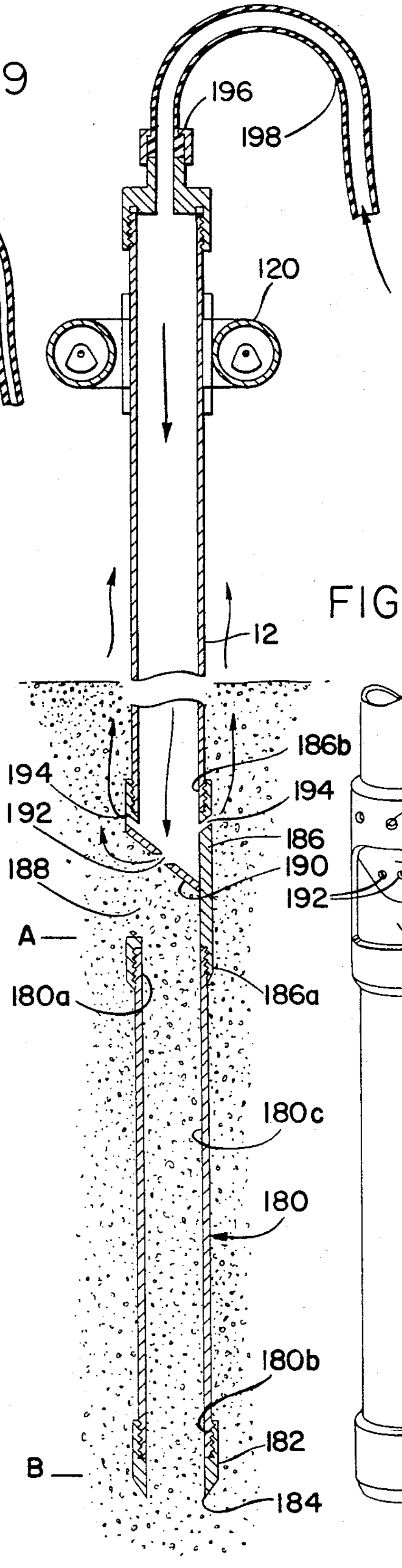
FIG. 20*a* is a cross-sectional view of yet another embodiment of this invention showing a pipe attached to a core tube.
Figure 20B:
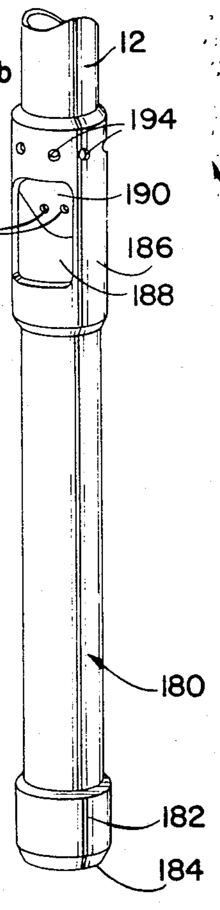
FIG. 20*b* is a perspective view of the novel core tube shown in FIG. 20*a*.
Figure 21:
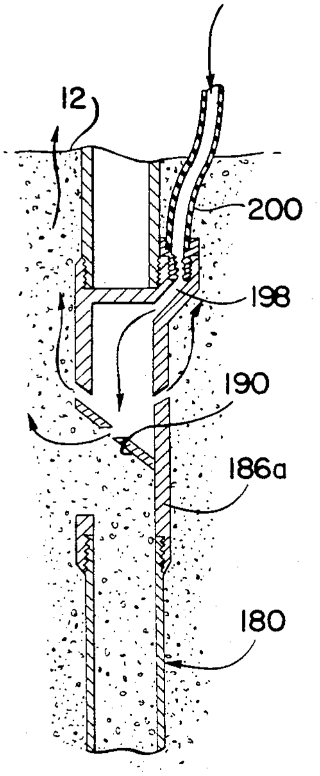
FIG. 21 is a cross-sectional view showing an alternate embodiment of the core tube shown in FIGS. 20*a* and 20*b*.

In accordance with another feature of this invention, water may be used to wash the outside wall of the pipe as it is being sunk into the ground. This further reduces the friction between the pipe wall and the ground, permitting less force to be used. This feature of the invention is shown in FIGS. 19, 20*a*, 20*b* and 21. FIGS. 20*a*, 20*b*, and 21 also illustrated the use of a novel core tube for boring a hole into the ground.

Figure 19:
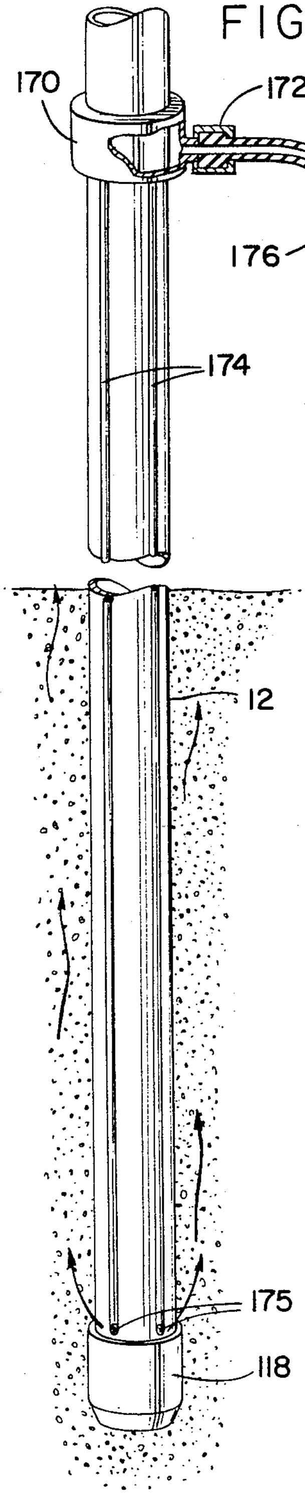
FIG. 19 is an embodiment of this invention showing one way of using water to reduce friction between the wall of a pipe and the ground.

Referring to FIG. 19, the pipe 12 has attached to its upper end a water conduit including a hollow annular member 170 which fits about the pipe. This annular member has a water inlet 172 and several vertical passageways 174 which extend downwardly along the pipe. The passageways have open ends 175 near the shoe 118. A tube 176 connected to the inlet 172 injects water under pressure into the annular member 170. This pressurized water flows through the passageways out the open ends 175, and then upwardly along the wall of the pipe, washing soil from the side of the pipe.

As shown in FIGS. 20*a*, 20*b* and 21, a core tube 180 may be used with the pipe 12 to retrieve cored sections of the ground. This core tube 180 has a hollow cylindrical section 180*c*, with oppositely threaded ends 180*a* and 180*b*. Attached to the end 180*b* is a cutting shoe 182 having an annular cutting blade or edge 184. Attached to the upper end 180*a* is a cylindrical pipe connector 186 having oppositely threaded segments 186*a* and 186*b*. The lower end 186*a* is attached to the threaded upper end 180*a* of the section 180*c*, and the upper end 186*b* of the connector is attached to the threaded end of the pipe. There is an enlarged opening or window 188 in the side of the pipe connector and an inclined baffle 190 is welded above the window inside of the pipe connector. There are one or more ports 192 in this baffle which allow water to flow through the baffle and out of the window opening. Just above the baffle are several orifices 194 in the wall of the pipe connector. An adapter 196 connected to the top of the pipe above the vibrator system 120 connects the pipe to a hose 198 which brings water under pressure from a source (not shown) and delivers it into the pipe.

In operation, water is injected into the pipe 12 as the vibrator system 120 causes vibrations in the pipe. The water flows downwardly through the pipe until it reaches the baffle 190. At the same time, ground material on the inside of the core tube moves into the pipe connector and strikes the baffle, which diverts the cored material out the opening 188. The water, flowing through the ports 192, assists in moving this material out of the opening. Water also flows upwardly out of the orifices 194 to wash soil from the side of the pipe and thereby also reduce friction as explained in relation to the FIG. 19 embodiment.

The embodiment shown in FIG. 21 is almost the same as that shown in FIGS. 20*a* and 20*b*, except that the pipe connector 186*a* is closed at its upper end connecting to the pipe but has off to one side above the baffle 190 a water inlet 198. Thus, instead of water flowing through the pipe 12 into the connector 186*a*, the water instead flows directly from a hose 200 into the connector via the inlet 198. In some instances this may be more convenient than the arrangement shown in FIGS. 20*a* and 20*b*.

In either of the embodiments shown in FIGS. 20*a*, 20*b* and 21, when the pipe and core tube reach in the ground a point where the pipe is no longer able to move, or, alternatively, a predetermined level from which a sample is to be recovered, the pipe and core tube are retrieved as explained above. Upon retrieval of the core tube, the hollow section 180*c* will contain a plug of sub-soil retained by the core catcher which was located between levels "A" and "B", in FIG. 20*a*, corresponding respectively to the levels of the baffle and the shoe. This plug is then removed, and the pipe and core tube reinserted into the hole to the lower level B and forced further down into the sub-soil to fill the hollow section 180*c* with another plug. Again the pipe and the core tube are removed from the hole. This operation is repeated until a hole of the desired depth is dug, while incremental samples of the ground are recovered at successive levels.

The above system for sinking a pipe into the ground and for retrieving it is a significant advance over systems which simply use rotation or use high amplitude shocks as in percussion drilling. Thus, we are able to sink the pipe and pull it out using simple thin wires. The wires help during both the sinking and lifting operations. Further our system may have water for washing soil from the outer wall of the pipe, further reducing friction between the ground and the pipe. Overall what has been described herein is a system which is simply constructed and therefore relatively inexpensive yet highly reliable.

What is claimed is:

1. A vibrating system adapted to be attached to a body, comprising:

a housing;

a pair of wheel means including axle means disposed parallel to each other mounted to said housing;

a mass secured to at least one of the wheel means so that the center of gravity of that wheel means is offset with respect to its axis of rotation;

means for rotating one of the wheel means including a flexible shaft means coupled to the axle of the wheel means being so rotated;

endless belt means connecting the pair of wheel means so that when one of the wheel means rotates the belt means transmits rotational motion to the other wheel means, said belt means being adapted to dampen vibrations propagating between said wheel means so that the frequency of vibrations in said body can exceed 150 hertz for sustained periods without damaging the rotating means or the belt means;

thrust bearings mounted to said housing to allow said body to rotate while vibrating;

a clutch mounted to said housing for disengaging said body from further rotation;

a flexible shaft for driving said wheel means; and a worm and crown gear mounted to said housing and also driven by said flexible shaft for causing rotation.

* * * * *